Oct. 27, 1925.　　　　　　　　　　　　　　　　1,558,482
J. D. KARLE
MOTOR VEHICLE FUEL SUPPLY DEVICE
Filed April 30, 1925　　2 Sheets-Sheet 1
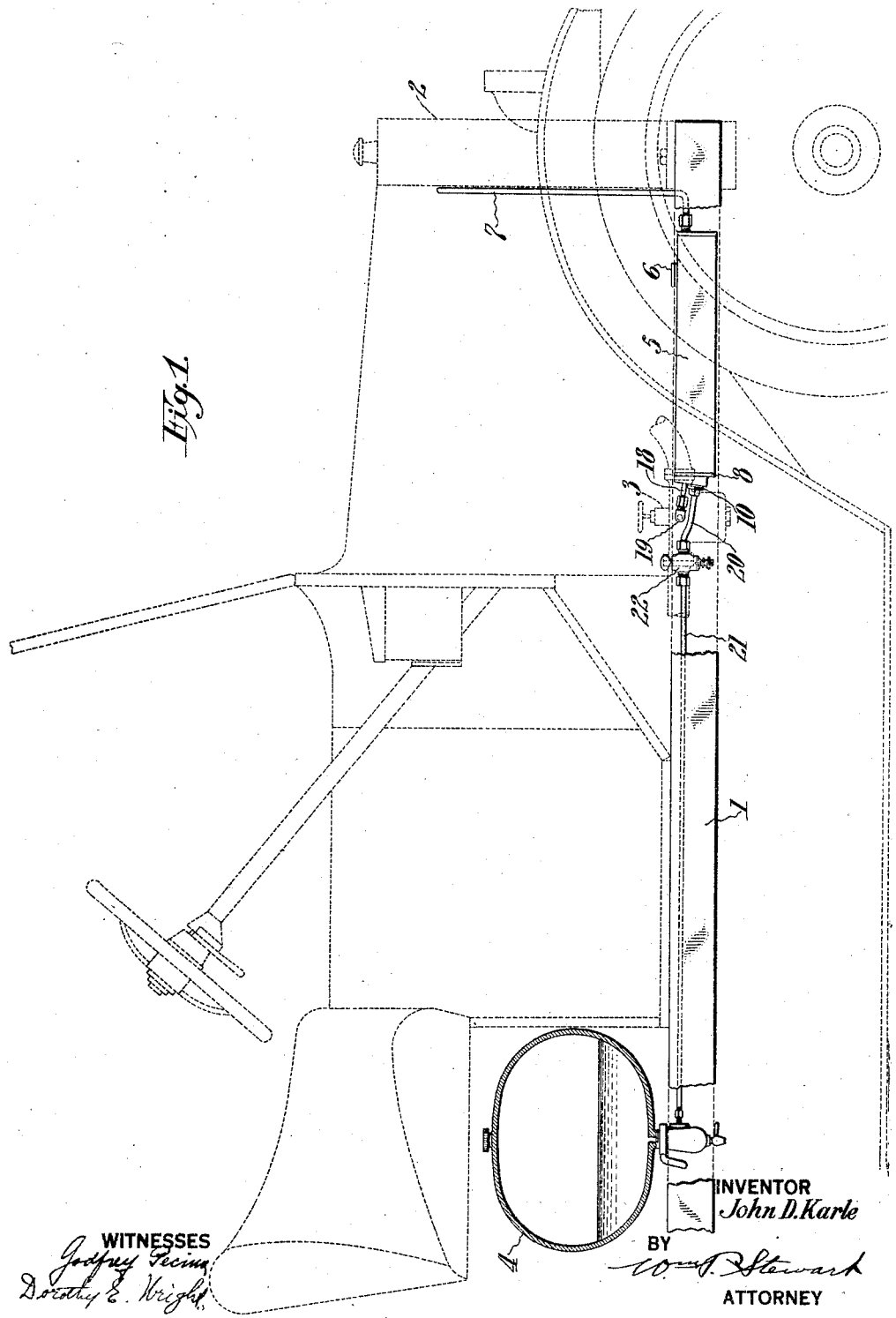
INVENTOR
John D. Karle Oct. 27, 1925.
J. D. KARLE
1,558,482
MOTOR VEHICLE FUEL SUPPLY DEVICE
Filed April 30, 1925     2 Sheets-Sheet 2
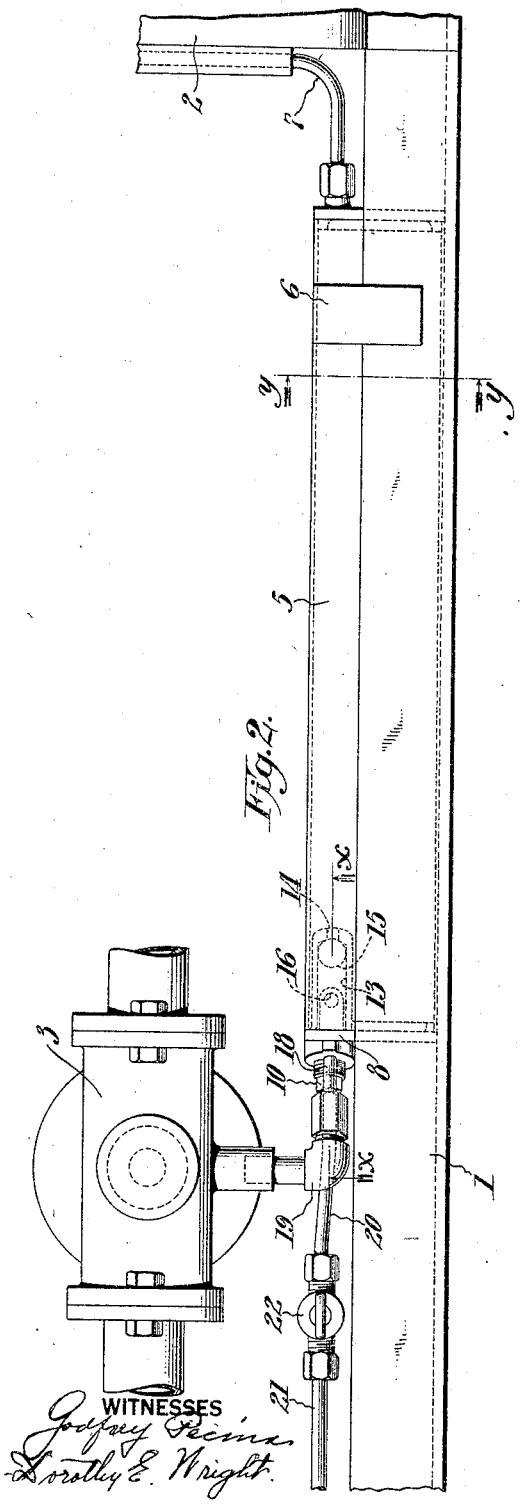
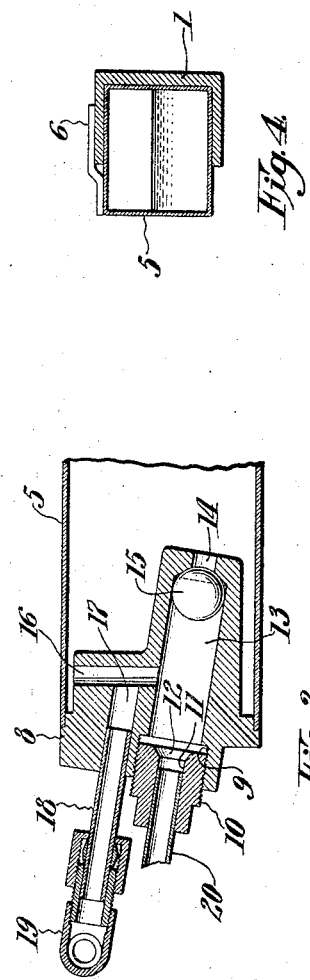
INVENTOR
John D. Karle
BY
ATTORNEY
WITNESSES Patented Oct. 27, 1925.

1,558,482

UNITED STATES PATENT OFFICE.

JOHN D. KARLE, OF ROSELLE PARK, NEW JERSEY.

MOTOR-VEHICLE FUEL-SUPPLY DEVICE.

Application filed April 30, 1925. Serial No. 26,961.

*To all whom it may concern:*

Be it known that I, JOHN D. KARLE, a citizen of the United States, residing at Roselle Park, in the county of Union and State of New Jersey, have invented certain new and useful Improvements in Motor-Vehicle Fuel-Supply Devices, of which the following is a specification, reference being had therein to the accompanying drawings.

This invention relates to improvements in fuel-supply controlling means for internal combustion engines of motor-propelled vehicles, more particularly of the type employing a gravity feed of the fuel from a fuel-tank to a carbureter.

The primary object of the present invention is to provide improved means for so controlling the supply of fuel to a carbureter as to obviate stalling of the vehicle-engine on an upgrade because of lack of sufficient fuel in the main fuel-tank.

More specifically, the present invention comprehends the provision of an improved auxiliary fuel-tank so disposed with respect to the main-tank, carbureter and engine of the vehicle as to insure the presence of an available preheated supply of fuel in an upgrade position of the vehicle and so constructed as to automatically control the flow of the fuel in a new and improved manner. The preferred embodiment of the present invention, as herein disclosed, constitutes an improvement on that forming the subject of my prior patent application Serial No. 677,709, filed Nov. 30, 1923, and comprises an auxiliary fuel-tank disposed within the vehicle U-shaped chassis-frame forwardly of the carbureter. The rear end of this auxiliary tank is connected with the main-tank and with the carbureter in such a manner that the fuel is under substantially level and downgrade positions of the vehicle conducted from the main-tank through the rear end of said auxiliary tank to the carbureter, whereby a preheating effect upon the fuel is obtained because of the position of the auxiliary tank with respect to the engine. Said auxiliary tank is furthermore so constructed as to insure an ample fuel-supply therein when the vehicle under its own power reaches an upgrade position, regardless of the quantity of fuel in the main-tank, which fuel-supply is automatically prevented from flowing back into the main-tank by a novel device embodied directly within the auxiliary tank.

In the accompanying drawings, Fig. 1, is a side elevation, partly in section, of a part of an automobile to illustrate the application of the present improvement thereto. Fig. 2 is a top-plan view of a portion of the chassis-frame and carbureter, with the auxiliary tank in the position it occupies in said frame. Fig. 3 is a sectional view substantially on the line X—X of Fig. 2. Fig. 4 is a sectional view substantially on the line Y—Y of Fig. 2.

Referring to the drawings, the present improvement is shown in its entirety as applied to a well known type of motor vehicle having a gravity feed of fuel from a main supply tank to a carbureter. According to its usual construction, the chassis-frame 1 is substantially U-shaped in cross section and sustains at its forward end the radiator 2. Disposed adjacent one member of the chassis-frame 1 is the carbureter 3 and rearwardly thereof is located the main fuel tank 4 for supplying fuel to the carbureter 3. It is well known that in a gravity feed fuel supply device, when the fuel-supply in the tank 4 is relatively low, no fuel will be supplied to the carbureter in an upgrade position of the vehicle even when the fuel supply is ample in a substantially level position of the vehicle. This condition is due to the relatively different levels of the fuel-supply and the carbureter.

To obviate this defect, the fuel is supplied to the carbureter through an elongated auxiliary tank 5 which is disposed forwardly of the carbureter within the U-shaped chassis-frame 1, said tank being preferably secured to said chassis-frame by means of a spring-clamp 6 fixed in a suitable manner to said auxiliary tank. Suitably connected with the forward end of the auxiliary tank is the usual vent-pipe 7, while the rear end wall 8 of said tank is specially constructed for controlling the flow of fuel into and out of the auxiliary tank. This end wall 8 is provided with an internally threaded aperture 9 in which is secured an externally threaded bushing 10 provided with a fuel-conduit receiving aperture 11 terminating in a conical valve-seat 12, constituting an inlet-port. The aperture 9 terminates in a smooth cylindrical bore 13 inclined downwardly and inwardly toward the base of the auxiliary tank, said bore constituting a valve-chamber which terminates at its end opposite to the valve seat 12 in a constricted emergency-port 14.

Disposed within the bore or chamber 13 is a ball 15 which in substantially level and downgrade positions of the vehicle closes the port 14, due to said inclination of the chamber 13. When however the vehicle reaches a certain upgrade angle the ball 15 gravitationally traverses the chamber 13 and becomes seated on the valve-seat 12, whereby fuel is permitted to enter the chamber 13 from the auxiliary tank through the emergency-port 14 and egress of fuel is prevented through the inlet-port 12.

Intersecting the valve chamber 13 so as to communicate therewith is a substantially vertical bore or connecting-port 16 formed in said end wall 8, which port terminates at its upper end closely adjacent to the upper wall of the auxiliary tank so as to communicate with the interior of said tank, the upper side of the end wall being suitably cut away for this purpose. The upper portion of the end wall 8 is also formed with a bore or outlet-port 17 above and substantially parallel with the chamber 13, said outlet port intersecting the connecting port 16 above the chamber 13. The outlet port 17 is entered by one end of a short fuel-conduit 18 of which the opposite end is coupled in regulation manner with an elbow 19 suitably connected with the carbureter 3. Disposed within the bushing aperture 11 is the end of a fuel-conduit 20 through which fuel is supplied from the main-tank to the chamber 13. The fuel in the chamber 13 passes into the connecting port 16 from which some of the fuel is conducted through the outlet port 17 to the carbureter, while the remainder may pass through the upper end of the connecting port 16 into the interior of the auxiliary tank.

It will be apparent that as the upper end of the connecting-port 16 is closely adjacent to the top of the auxiliary tank, said tank will remain filled in level and downgrade positions of the vehicle, i. e., the auxiliary tank cannot be drawn upon to any substantial degree for supplying fuel to the carbureter in the indicated positions of the vehicle because the emergency-port 14 is in these positions closed by the ball 15 and because of the location of the top of the connecting port 16 at the top of said tank. Furthermore, said auxiliary tank will always be kept filled by the main-tank in level and downgrade positions of the vehicle because the top of said port 16 and the carbureter connections are at substantially the same levels. Therefore a supply of fuel to the carbureter from the auxiliary tank is always insured in an upgrade position of the vehicle, regardless of the amount of fuel in the main tank, a portion of said auxiliary-tank supply in this position of the vehicle feeding through the connecting port 16 to the carbureter and most of the remainder through the emergency-port 14, it being remembered that in an upgrade position of the vehicle the ball 15 closes the inlet-port 12 to prevent the fuel from flowing back into the main tank.

The fuel-conduit 20 is connected with a conduit 21 which is in turn connected in the usual manner with the bottom of the main-tank 4. Interposed in said conduit connections, however, is preferably a shut-off valve 22 which may be of regulation construction and has for its function to provide convenient means for at will shutting-off the flow of fuel from the main-tank.

Having thus set forth the nature of the invention, what I claim herein is—

1. The combination with a carbureter of a motor-vehicle, and a main fuel-tank disposed rearwardly of said carbureter, of an auxiliary fuel-tank disposed forwardly of said carbureter having fuel inlet and outlet ports, a fuel-conduit connecting the main-tank with said inlet-port, a fuel-conduit connecting said outlet-port with the carbureter, and an automatically acting valve-member incorporated in said auxiliary tank for closing said inlet-port in an upgrade position of the vehicle.

2. The combination with a carbureter of a motor-vehicle, and a main fuel-tank disposed rearwardly of said carbureter, of an auxiliary fuel-tank having at the rear end thereof fuel-inlet and outlet ports together with an inlet and outlet port connecting-port, said inlet-port being disposed below the level of said outlet-port, and fuel-conduits connecting said inlet- and outlet-ports with the main fuel-tank and said carbureter.

3. The combination with a carbureter of a motor-vehicle, and a main fuel-tank disposed rearwardly of said carbureter, of an auxiliary fuel-tank disposed forwardly of said carbureter provided with a rear end wall having fuel inlet- and outlet-ports, a fuel-conduit connecting the main-tank with said inlet-port, and a fuel-conduit connecting the outlet-port with the carbureter, said rear end wall being also provided with a bore connecting both of said ports with the interior of the auxiliary tank.

4. The combination with a carbureter of a motor-vehicle, and a main fuel-tank disposed rearwardly of said carbureter, of an auxiliary fuel-tank disposed forwardly of said carbureter having a rear end wall provided with inlet- and outlet-ports, said outlet-port being disposed above the inlet-port, a fuel-conduit connecting the main-tank with said inlet-port, a fuel-conduit connecting the outlet-port with the carbureter, and a gravity-propelled member incorporated in said auxiliary-tank for closing said inlet-port in an upgrade position of the vehicle.

5. In a motor-vehicle, the combination with a main fuel-tank, and a carbureter, of means for supplying fuel from said main-tank to the carbureter including an auxiliary-tank disposed forwardly of said carbureter having fuel-conducting connections independent of each other with both the main-tank and the carbureter, the carbureter-connection with said auxiliary-tank being disposed above the main-tank connection therewith in a horizontal position of the vehicle, and an automatically acting valve-member for closing the main-tank connection with the auxiliary tank in an upgrade position of the vehicle.

6. In a motor-vehicle, the combination with a carbureter, and a main-tank disposed rearwardly of said carbureter, of an auxiliary-tank disposed forwardly of said carbureter having a wall provided with an inlet-port terminating in a valve-chamber, said wall being also provided with an outlet-port connected with said chamber, a valve-member disposed within said chamber for automatically closing said inlet-port in an upgrade position of the vehicle, a fuel-conduit connecting said inlet-port with the main-tank, and a fuel-conduit connecting said outlet-port with the carbureter.

7. In a motor-vehicle, the combination with a carbureter, and a main fuel-tank, of an auxiliary fuel-tank provided with connected inlet- and outlet-ports of which the outlet-port is disposed above the inlet-port and the inlet-port discharges fuel into the auxiliary tank at a point near the upper wall thereof, and an automatically closed and opened emergency port for connecting the lower portion of the auxiliary tank with said outlet-port.

8. In a motor-vehicle, the combination with a carbureter, and a main fuel-tank, of an auxiliary fuel-tank having a rear end wall provided with a valve-chamber, said valve-chamber having an emergency-port opening into the lower interior of said auxiliary-tank and having fuel-feed connections with the main-tank, with the carbureter and with the upper interior of the auxiliary tank, and a gravity-controlled valve incorporated in said auxiliary-tank for closing said emergency-port in substantially level and downgrade positions of the vehicle.

In testimony whereof I have signed my name to this specification.

JOHN D. KARLE.